(12) United States Patent
Zhang et al.

(10) Patent No.: US 11,443,774 B2
(45) Date of Patent: Sep. 13, 2022

(54) STRUCTURE FOR FACILITATING HARD DISK MAINTENANCE AND METHOD FOR HARD DISK MAINTENANCE

(71) Applicant: RAMAXEL TECHNOLOGY (SHENZHEN) LIMITED, Shenzhen (CN)

(72) Inventors: Guangyi Zhang, Shenzhen (CN); Ningbo Wei, Shenzhen (CN)

(73) Assignee: RAMAXEL TECHNOLOGY (SHENZHEN) LIMITED, Shenzhen (CN)

(*) Notice: Subject to any disclaimer, the term of this patent is extended or adjusted under 35 U.S.C. 154(b) by 0 days.

(21) Appl. No.: 17/197,023

(22) Filed: Mar. 9, 2021

(65) Prior Publication Data
US 2022/0101886 A1 Mar. 31, 2022

(30) Foreign Application Priority Data
Sep. 27, 2020 (CN) .......................... 202011033331.7

(51) Int. Cl.
*G11B 33/02* (2006.01)
*G06F 1/18* (2006.01)
*G11B 33/12* (2006.01)

(52) U.S. Cl.
CPC ............ *G11B 33/022* (2013.01); *G06F 1/187* (2013.01); *G11B 33/127* (2013.01)

(58) Field of Classification Search
CPC ............................. G11B 33/022; G06F 1/187
See application file for complete search history.

(56) References Cited

U.S. PATENT DOCUMENTS

| | | | | |
|---|---|---|---|---|
| 5,112,119 A | * | 5/1992 | Cooke | G06F 1/187 312/283 |
| 5,212,681 A | * | 5/1993 | Bock | G11B 33/128 360/99.18 |
| 5,277,615 A | * | 1/1994 | Hastings | G06F 1/184 |
| 5,483,419 A | * | 1/1996 | Kaczeus, Sr. | G11B 33/1446 312/274 |
| 5,602,717 A | * | 2/1997 | Leshem | H05K 7/1438 439/378 |
| 5,757,617 A | * | 5/1998 | Sherry | H05K 7/1461 |
| 6,014,319 A | * | 1/2000 | Kuchta | G06F 1/184 361/730 |
| 6,142,796 A | * | 11/2000 | Behl | G11B 33/122 439/131 |
| 6,193,339 B1 | * | 2/2001 | Behl | G11B 33/02 361/753 |
| 6,483,107 B1 | * | 11/2002 | Rabinovitz | G11B 33/022 |
| 7,362,565 B2 | * | 4/2008 | Imblum | G11B 33/142 |

(Continued)

*Primary Examiner* — Brian E Miller
(74) *Attorney, Agent, or Firm* — Robert L. Stearns; Dickinson Wright, PLLC (57) ABSTRACT

A structure for facilitating hard disk maintenance comprises a housing, a hard disk bracket, a hard disk backplane, a hard disk, and a hard disk mounting assembly. The hard disk bracket is provided at a front end and a rear end of the housing. The hard disk backplane connects to a bottom of the housing and the hard disk mounting assembly. The hard disk mounting assembly connects to the hard disk bracket. The hard disk backplane is further provided with a hard disk interface, and the hard disk is also connected to the hard disk interface.

9 Claims, 12 Drawing Sheets

(56) References Cited

U.S. PATENT DOCUMENTS

| | | | |
|---|---|---|---|
| 7,483,268 B1* | 1/2009 | King, Jr. | G06F 1/187 312/331 |
| 8,508,928 B2* | 8/2013 | Killen | G11B 33/128 361/679.33 |
| 9,348,374 B2* | 5/2016 | Liao | G06F 1/187 |
| 9,629,275 B1* | 4/2017 | Beall | G11B 33/128 |
| 10,281,961 B1* | 5/2019 | Lin | G06F 1/187 |
| 2002/0181198 A1* | 12/2002 | White | G06F 1/184 |
| 2003/0003816 A1* | 1/2003 | Bolognia | G11B 33/08 |
| 2004/0057202 A1* | 3/2004 | Rabinovitz | G11B 33/128 |
| 2004/0100762 A1* | 5/2004 | Yuan | G11B 33/128 |
| 2005/0201053 A1* | 9/2005 | Scicluna | G11B 33/10 361/679.33 |
| 2011/0069441 A1* | 3/2011 | Killen | G11B 33/124 361/679.33 |
| 2011/0188196 A1* | 8/2011 | Sivertsen | G11B 33/125 361/679.37 |
| 2011/0320690 A1* | 12/2011 | Petersen | G06F 3/0611 711/E12.019 |
| 2012/0002364 A1* | 1/2012 | Goodman | G02B 6/0001 340/815.45 |
| 2012/0026674 A1* | 2/2012 | Aldridge | G06F 1/187 361/679.33 |
| 2012/0243170 A1* | 9/2012 | Frink | G06F 1/3287 361/679.33 |
| 2013/0244480 A1* | 9/2013 | Wang | G06F 1/187 439/541.5 |
| 2013/0341293 A1* | 12/2013 | Peng | G11B 33/128 248/68.1 |
| 2014/0233182 A1* | 8/2014 | Demange | H05K 7/1409 361/679.58 |
| 2014/0345105 A1* | 11/2014 | Brockett | G06F 1/187 29/762 |
| 2015/0015131 A1* | 1/2015 | Privitera | G06F 1/187 312/309 |
| 2015/0316964 A1* | 11/2015 | Albert | G06F 1/187 211/41.12 |
| 2016/0157379 A1* | 6/2016 | Du | G11B 33/124 29/832 |
| 2016/0217097 A1* | 7/2016 | Gomez | G06F 1/187 |
| 2017/0060176 A1* | 3/2017 | Lien | G06F 1/187 |
| 2018/0123272 A1* | 5/2018 | Mundt | H05K 7/1452 |
| 2018/0366163 A1* | 12/2018 | Amin-Shahidi | H01R 12/91 |
| 2020/0310501 A1* | 10/2020 | Tsorng | G11B 33/123 |

* cited by examiner

STRUCTURE FOR FACILITATING HARD DISK MAINTENANCE AND METHOD FOR HARD DISK MAINTENANCE

CROSS REFERENCE TO RELATED APPLICATIONS

The present application claims priority to Chinese Patent Application No. 202011033331.7 filed on Sep. 27, 2020, the entire content of which is incorporated herein by reference.

TECHNICAL FIELD

The present application relates to the field of hard disk maintenance technologies, and particularly to a structure for facilitating hard disk maintenance and a method for hard disk maintenance.

BACKGROUND

Servers require simpler maintenance methods and less maintenance time, such as the maintenance for a power supply backplane, a fan backplane, or a hard disk backplane that is easily damaged. For a storage server, the maintenance for the hard disk backplane is more complicated, the main reason is that the hard disk backplane is provided with many plug-in parts and is complicated to disassemble and assemble. In order to strengthen the machine body, a lower end of a hard disk bracket of most machine models is fixed to a bottom end of the housing, so that the hard disk backplane cannot be mounted in a simple way of plugging and unplugging, making the maintenance of the hard disk backplane extremely cumbersome.

At present, the hard disk backplanes of the servers on the market are wearable parts and require regular maintenance. For servers that plug and unplug the hard disks in a direction perpendicular to the ground, the maintenance can be performed until all hard disks are unplugged, which takes a long time.

SUMMARY

A purpose of the present application lies in overcoming the defects in the prior art and providing a structure for facilitating hard disk maintenance and a method for hard disk maintenance.

In order to realize the above purpose, technical solutions adopted by the present application are as follows.

A structure for facilitating hard disk maintenance, comprises a housing, a hard disk bracket, a hard disk backplane, a hard disk, and a hard disk mounting assembly, wherein the hard disk bracket is provided at a front end and a rear end of the housing, the hard disk backplane is connected to a bottom of the housing, the hard disk is connected to the hard disk mounting assembly, the hard disk mounting assembly is connected to the hard disk bracket, the hard disk backplane is further provided with a hard disk interface, and the hard disk is also connected to the hard disk interface.

A further technical solution of the structure for facilitating hard disk maintenance is as follows: the hard disk bracket comprises a first hard disk bracket, a second hard disk bracket, a push rod, and several stoppers; the first hard disk bracket is provided with columns corresponding to the stoppers, and the stoppers are sleeved on the columns; the second hard disk bracket is provided with several fixture blocks, the push rod is movably connected to the fixture blocks, the push rod is further provided with protruded blocks and openings corresponding to positions of the stoppers, a top end of each of the stopper is provided with a protrusion part corresponding to the protruded block, and the first hard disk bracket is further provided with square holes corresponding to the stoppers; the first hard disk bracket is clamped with the second hard disk bracket.

A further technical solution of the structure for facilitating hard disk maintenance is as follows: the front end and the rear end of the housing are further provided with a notch slot, and the hard disk bracket is inserted into the notch slot.

A further technical solution of the structure for facilitating hard disk maintenance is as follows: a handle is further provided at one side of the push rod, and the handle is located outside the notch slot.

A further technical solution of the structure for facilitating hard disk maintenance is as follows: the housing is U-shaped.

A further technical solution of the structure for facilitating hard disk maintenance is as follows: the first hard disk bracket and the second hard disk bracket are further provided with a sliding groove corresponding to the hard disk mounting assembly.

A further technical solution of the structure for facilitating hard disk maintenance is as follows: a tray is further sleeved on an outside of the hard disk backplane.

A further technical solution of the structure for facilitating hard disk maintenance is as follows: the number of the stoppers is 2-4; the number of the stoppers, the number of the hard disks, and the number of the hard disk interfaces are the same.

A further technical solution of the structure for facilitating hard disk maintenance is as follows: the hard disk mounting assembly comprises a hard disk mounting frame, a hard disk handle, an elastic sheet, a pin, and a spring; the hard disk mounting frame is connected to the hard disk bracket, and the hard disk is connected to the hard disk mounting frame; a top end of the hard disk mounting frame is provided with a cavity, the cavity is provided with a counterbore, the counterbore is provided with a guide post, the spring is sleeved on the guide post, and the hard disk handle is located above the counterbore; a baffle is provided above one end of the cavity, one end of the elastic sheet is connected to the baffle, and the other end of the elastic sheet is connected to the hard disk handle; the hard disk mounting frame is further provided with a through hole, and the pin is inserted through the through hole and is connected to the hard disk handle; a rear end of the hard disk handle is further provided with a protruding portion, and the protruding portion corresponds to a position of the square hole.

A method for hard disk maintenance, based on the above-mentioned structure for facilitating hard disk maintenance, comprises the following steps of:

when a hard disk needs to be mounted, firstly sleeving stoppers on columns of a first hard disk bracket, then mounting a push rod on fixture blocks of a second hard disk bracket, and next riveting the first hard disk bracket and the second hard disk bracket to form a hard disk bracket;

clamping the hard disk bracket with a housing, then inserting a hard disk backplane welded with a hard disk interface into a bottom of the housing, and fixing the hard disk backplane to the bottom of the housing with a screw;

putting a spring into a guide post, and then pushing an elastic sheet into a cavity, placing a hard disk handle above the spring, such that one end of the elastic sheet is connected to a baffle and the other end of the elastic sheet is connected to the hard disk handle; and then inserting a pin through a through hole to fix the hard disk handle with a hard disk mounting frame, and next fixing the hard disk with the hard disk mounting frame with a screw;

inserting the hard disk mounting frame into the housing from top to bottom until the hard disk is completely docked with the hard disk interface to complete mounting of the hard disk;

when the hard disk requires maintenance, firstly pulling the elastic sheet toward the baffle, at this time the hard disk handle is popped out under an action of the spring; and then pulling the hard disk mounting frame upwards while pulling the push rod outward, at this time the stoppers lose pressing of protruded blocks, return to their original positions under an elastic effect, and block square holes on the first hard disk bracket, so that a protruding portion at a rear end of the hard disk handle has no access into the square hole, the rear end of the hard disk handle hangs on an upper end surface of the first hard disk bracket, and the hard disk mounting frame is prevented from moving downward;

unscrewing the screw on the hard disk backplane, and then pulling out the hard disk backplane from the housing to maintain the hard disk backplane;

inserting the maintained hard disk backplane into the housing, then fixing the maintained hard disk backplane with the screw, and next pushing the push rod inward, at this time the stoppers rotate away from the square holes of the first hard disk bracket under the pressing of the protruded blocks; and then pressing the hard disk mounting frame downward, and next pressing the hard disk handle, such that the protruding portion at the rear end of the hard disk handle is inserted into the square hole, and a front end of the hard disk handle is snapped into the elastic sheet; and then fully docking the hard disk with the hard disk interface to complete maintenance of the hard disk.

Compared with the prior art, the beneficial effects of the present application lies in that: through arranging the hard disk bracket at the front end and the rear end of the housing, connecting the hard disk backplane to the bottom of the housing, connecting the hard disk to the hard disk mounting assembly, connecting the hard disk mounting assembly to the hard disk bracket, providing the hard disk interface on the hard disk backplane, and connecting the hard disk with the hard disk interface, the hard disk backplane is enabled to be plugged and unplugged from the rear end of the housing, and the hard disk backplane can be maintained only by pulling out a part of the hard disk, which simplifies the maintenance process of the hard disk backplane, shortens the maintenance time, and realizes tool-free quick mounting and removal, moreover a locking function is provided.

The present application will be further described in conjunction with the drawings and specific embodiments.

DESCRIPTION OF THE DRAWINGS

In order to illustrate the technical solutions of the embodiments of the present application more clearly, the drawings needed to be used in the description for the embodiments are briefly introduced below. Obviously, the drawings in the following description are some embodiments of the present application, and other drawings may also be obtained based on these drawings for those skilled in the art without paying creative effort.

DETAILED EMBODIMENTS

In order to make the purpose, technical solutions, and advantages of the present application more comprehensible, the present application will be further described in detail below with reference to the accompanying drawings and the specific embodiments.

The technical solutions in the embodiments of the present application will be clearly and completely described below in conjunction with the accompanying drawings in the embodiments of the present application. Obviously, the described embodiments are only partial embodiments, rather than all embodiments, of the present application. Based on the embodiments of the present application, all other embodiments obtained by those skilled in the art without creative work shall fall within the protection scope of the present application.

In the description of the present application, it should be understood that the orientation or position relationship, indicated by the term "center", "longitudinal", "transverse", "length", "width", "thickness", "upper", "lower", "front", "back", "left", "right", "vertical", "horizontal", "top", "bottom", "inner", "outer", "clockwise", "counterclockwise" or the like, is based on the orientation or position relationship as shown in the drawings, which is only for the convenience of describing the present application and simplifying the description, rather than indicating or implying that the indicated device or element must be provided with a specific orientation, be constructed and operated in a specific orientation, therefore it cannot be understood as a limitation to the present application.

In addition, the terms "first" and "second" are only used for the descriptive purpose, and cannot be understood as indicating or implying relative importance or implicitly indicating the number of an indicated technical feature. Thus, the feature defined with "first" or "second" may explicitly or implicitly include one or more of this feature. In the description of the present application, "plurality" means two or more, unless otherwise specifically defined.

In the present application, unless otherwise clearly specified and limited, the terms "mounting", "connecting", "coupling", "fixing" and the like should be understood in a broad sense. For example, the "connection" may be connection or detachable connection, or integrated; the "connection" may be a mechanical connection or an electrical connection; the "connection" may be direct connection, or indirect connection through an intermediate medium, alternatively, the "connection" may be internal communication of two elements or mutual interaction between two elements. For those of ordinary skill in the art, the specific meanings of the above terms in the present application can be understood according to specific circumstances.

In the present application, unless otherwise clearly specified and limited, that the first feature is "above" or "below" the second feature may include direct contact of the first feature and the second feature, or may include contact through an additional feature between them rather than direct contact of the first feature and second feature. Moreover, that the first feature is "above", "on top of", or "on" the second feature include that the first feature is directly above the second feature or obliquely above the second feature, or simply means that the level of the first feature is higher than the level of the second feature. That the first feature is "below", "beneath", or "under" the second feature include that the first feature is directly below the second feature or obliquely below the second feature, or simply means that the level of the first feature is lower than the level of the second feature.

In the description of this specification, descriptions with reference to the terms "one embodiment", "some embodiments", "examples", "specific examples", or "some examples" etc. mean that specific features, structures, materials or characteristics described in conjunction with the embodiment or example are included in at least one embodiment or example of the present application. In this specification, the schematic representation of the above-mentioned terms should not be understood as necessarily referring to the same embodiment or example. Moreover, the described specific features, structures, materials or characteristics may be combined in any one or more embodiments or examples in a suitable manner. In addition, those skilled in the art can incorporate and combine different embodiments or examples described in this specification.

In the specific embodiments as shown in FIGS. 1 to 12, as shown in FIGS. 1 to 7, the present application discloses a structure for facilitating hard disk maintenance, which includes a housing 10, a hard disk bracket 20, a hard disk backplane 30, a hard disk 40, and a hard disk mounting assembly 50. The hard disk bracket 20 is provided at a front end and a rear end of the housing 10, the hard disk backplane 30 is connected to a bottom of the housing 10, the hard disk 40 is connected to the hard disk mounting assembly 50, and the hard disk mounting assembly 50 is connected to the hard disk bracket 20. The hard disk backplane 30 is further provided with a hard disk interface 31, and the hard disk 40 is also connected to the hard disk interface 31.

Specifically, as shown in FIGS. 1 to 5, the hard disk bracket 20 includes a first hard disk bracket 21, a second hard disk bracket 22, a push rod 23, and several stoppers 24. The first hard disk bracket 21 is provided with columns 211 corresponding to the stoppers 24, the stoppers 24 are sleeved on the columns 211, and the stoppers 24 may rotate around the columns 211. The second hard disk bracket 22 is provided with several fixture blocks 221, the push rod 23 is movably connected to the fixture blocks 221, and the push rod 23 is transversely arranged in the fixture blocks 221. The push rod 23 is further provided with protruded blocks 231 and openings 232 corresponding to positions of the stoppers 24. A top end of each of the stopper 24 is provided with a protrusion part 241 corresponding to the protruded block 231, and the first hard disk bracket 21 is further provided with square holes 212 corresponding to the stoppers 24. The first hard disk bracket 21 is clamped with the second hard disk bracket 22, the connection of which is firm and is provided with high strength, while it is easy to disassemble and assemble.

Figure 1:
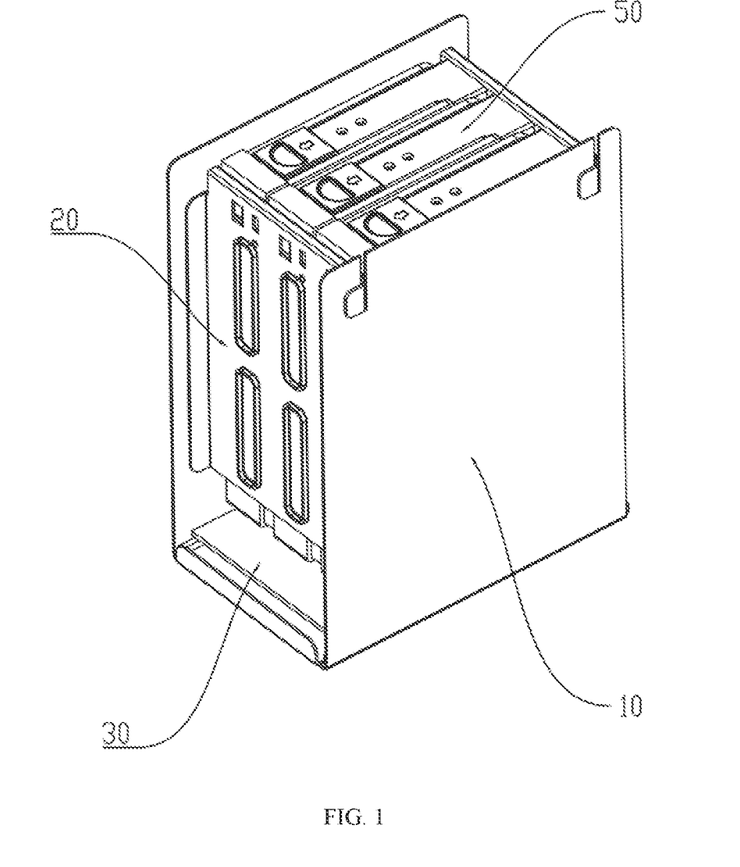
FIG. 1 is a stereoscopic view of a structure for facilitating hard disk maintenance according to the present application.
Figure 2:
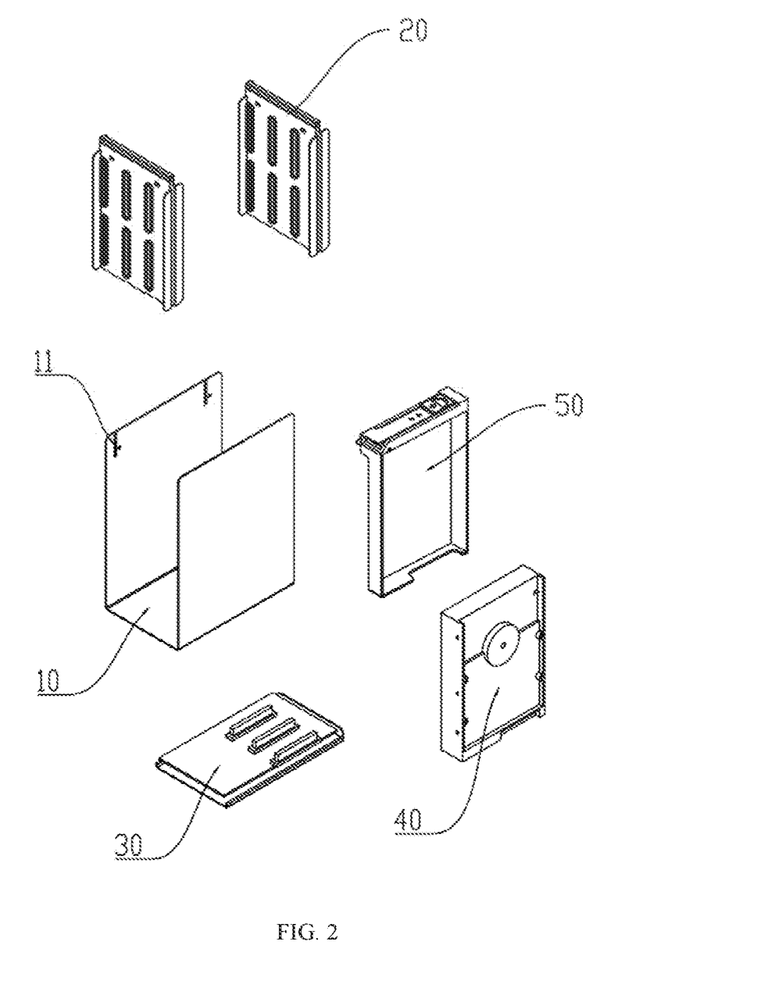
FIG. 2 is an exploded view of the structure for facilitating hard disk maintenance according to the present application.
Figure 3:
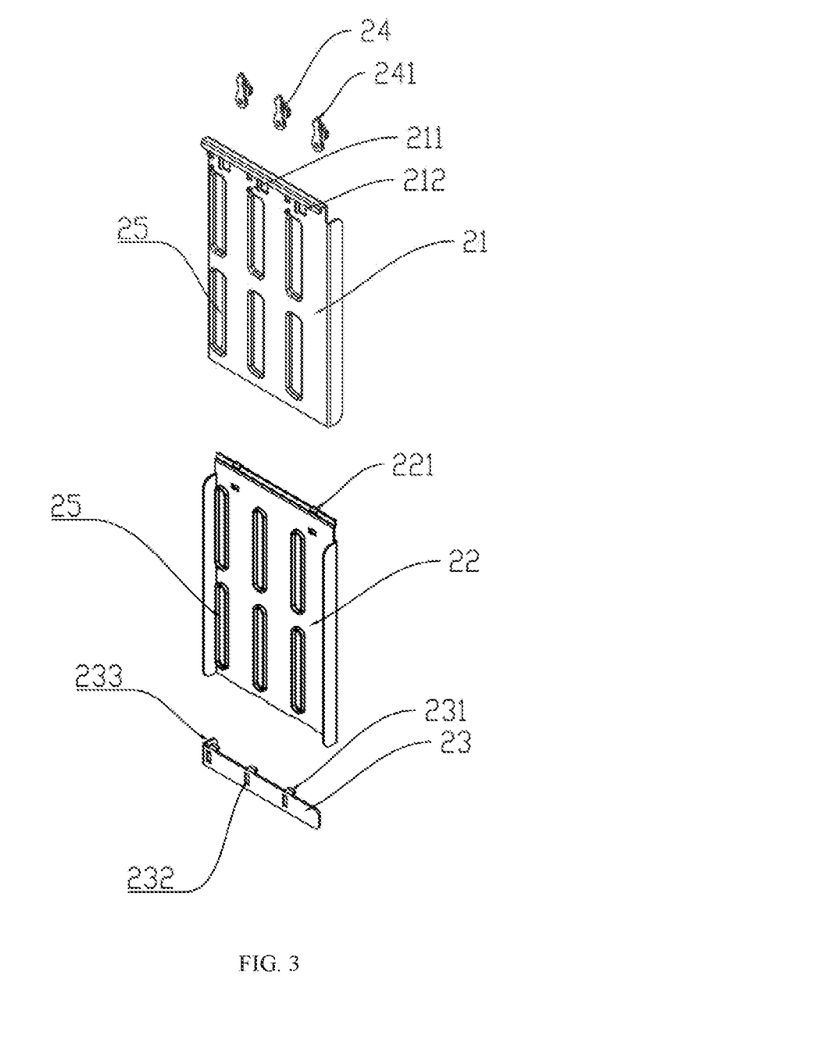
FIG. 3 is a first structural diagram of a hard disk bracket according to the present application.
Figure 4:
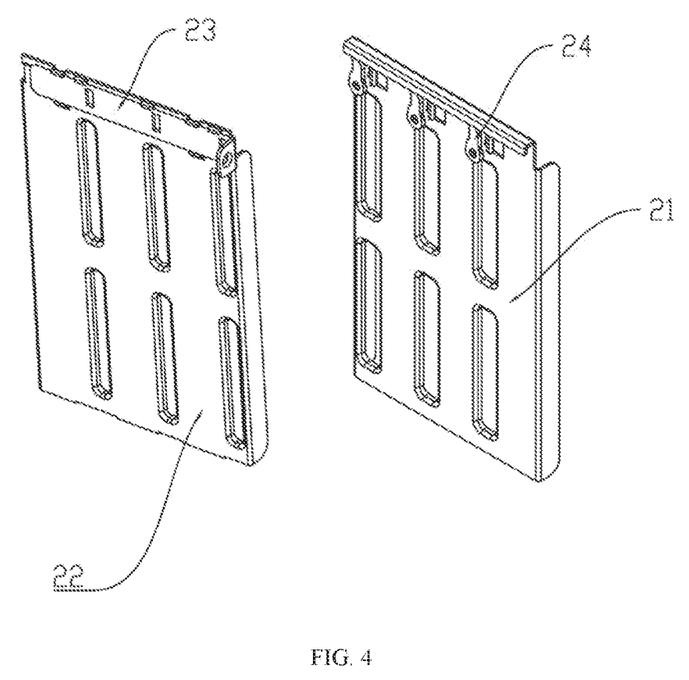
FIG. 4 is a second structural diagram of the hard disk bracket according to the present application.

Optionally, in this embodiment, the positions of the openings 232 correspond to the positions of the square holes 212.

Figure 5:
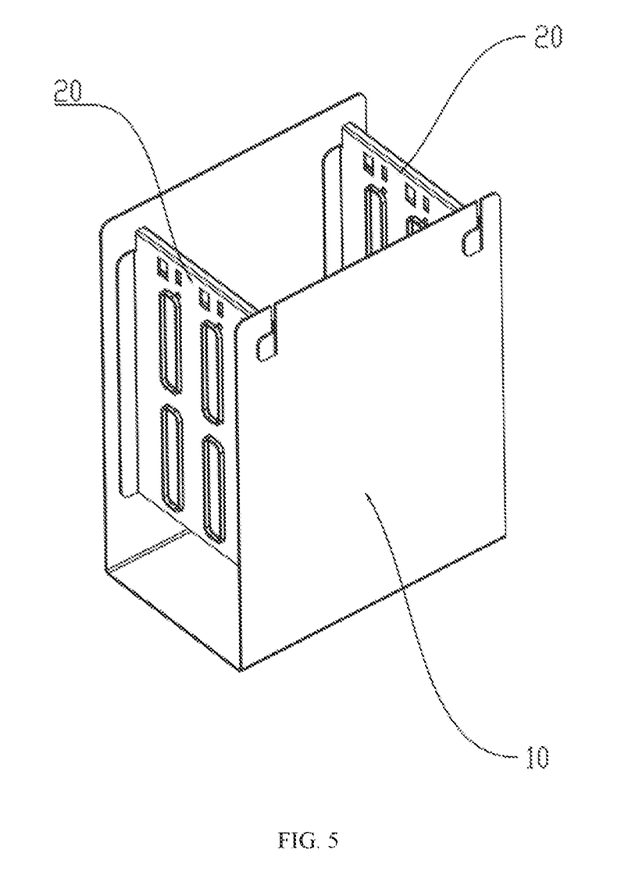
FIG. 5 is a schematic diagram of connection between the hard disk bracket and the housing according to the present application.

Optionally, in this embodiment, the front end and the rear end of the housing 10 are further provided with a notch slot 11, and the hard disk bracket 20 is inserted into the notch slot 11, which is convenient for disassembly and assembly and is firmly connected, thereby saving space.

Specifically, as shown in FIGS. 3 to 4, a handle 233 is further provided at one side of the push rod 23, and the handle 233 is located outside the notch slot 11 to facilitate the pulling and inserting operations of the push rod 23.

Optionally, the housing 10 is U-shaped, and the front end and the rear end are open, which is convenient for production and convenient for disassembly and assembly of the hard disk bracket 20.

Optionally, the first hard disk bracket 21 and the second hard disk bracket 22 are further provided with several sliding groove 25 corresponding to the hard disk mounting assembly 50, which are configured to mount and fix the hard disk mounting assembly 50 and configured to protect the hard disk mounting assembly 50 and limit the position of the hard disk mounting assembly 50, such that the hard disk mounting assembly 50 will not loosen.

Figure 6:
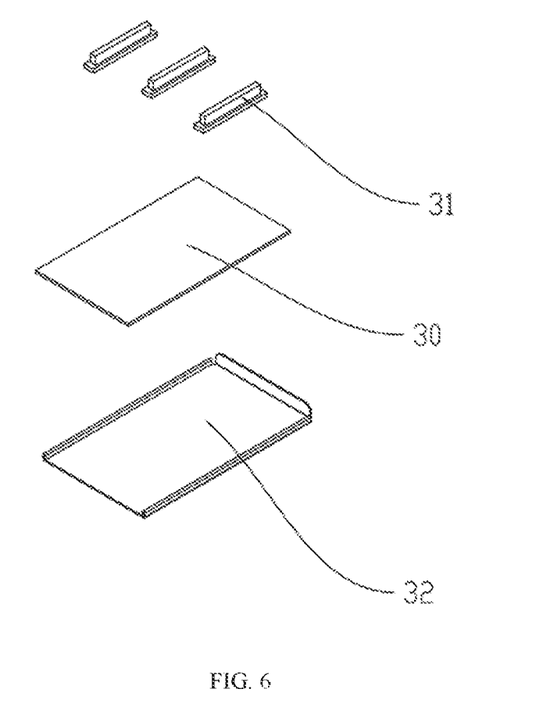
FIG. 6 is an exploded view of a hard disk backplane according to the present application.

Specifically, as shown in FIG. 6, a tray 32 is further sleeved on an outside of the hard disk backplane 30 to protect the hard disk backplane 30, thereby increasing the strength and endurance.

Optionally, in this embodiment, the number of the stoppers 24 is 2-4; the number of the stoppers 24, the number of the hard disks 40, and the number of the hard disk interfaces 31 are the same.

Figure 7:
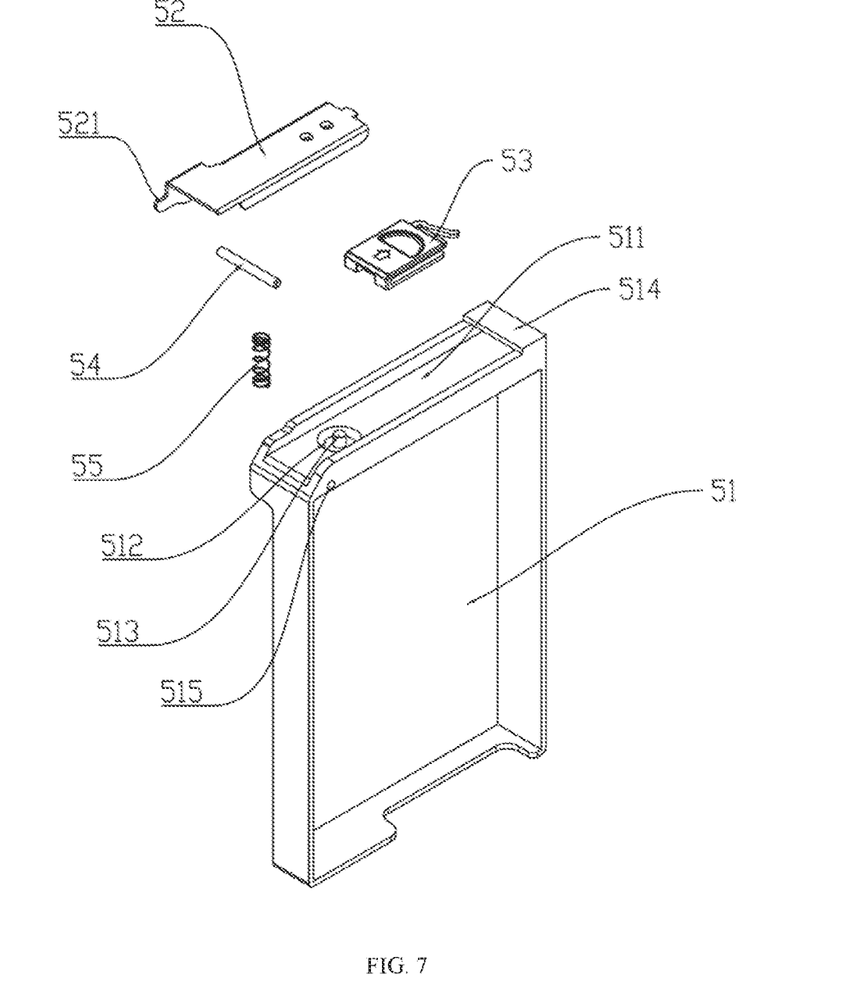
FIG. 7 is an exploded view of a hard disk mounting assembly according to the present application.

Specifically, as shown in FIG. 7, the hard disk mounting assembly 50 includes a hard disk mounting frame 51, a hard disk handle 52, an elastic sheet 53, a pin 54, and a spring 55. The hard disk mounting frame 51 is connected to the hard disk bracket 20, and the hard disk 40 is connected to the hard disk mounting frame 51. A top end of the hard disk mounting frame 51 is provided with a cavity 511, the cavity 511 is provided with a counterbore 512, and the counterbore 512 is provided with a guide post 513. The spring 55 is sleeved on the guide post 513, and the hard disk handle 52 is located above the counterbore 512. A baffle 514 is provided above one end of the cavity 511, one end of the elastic sheet 53 is connected to the baffle 514, and the other end of the elastic sheet 53 is connected to the hard disk handle 52. The hard disk mounting frame 51 is further provided with a through hole 515, and the pin 54 is inserted through the through hole 515 and is connected to the hard disk handle 52. A rear end of the hard disk handle 52 is further provided with a protruding portion 521, and the protruding portion 521 corresponds to the position of the square hole 212.

The present application enables the hard disk backplane to be plugged and unplugged from the rear end of the housing, and the hard disk backplane can be maintained only by pulling out a part of the hard disk, which simplifies the maintenance process of the hard disk backplane, shortens the maintenance time, and realizes tool-free quick mounting and removal, moreover a locking function is provided.

As shown in FIGS. 8 to 12, the present application also discloses a method for hard disk maintenance, which, based on the above-mentioned structure for facilitating hard disk maintenance, includes the following steps.

Figure 8:
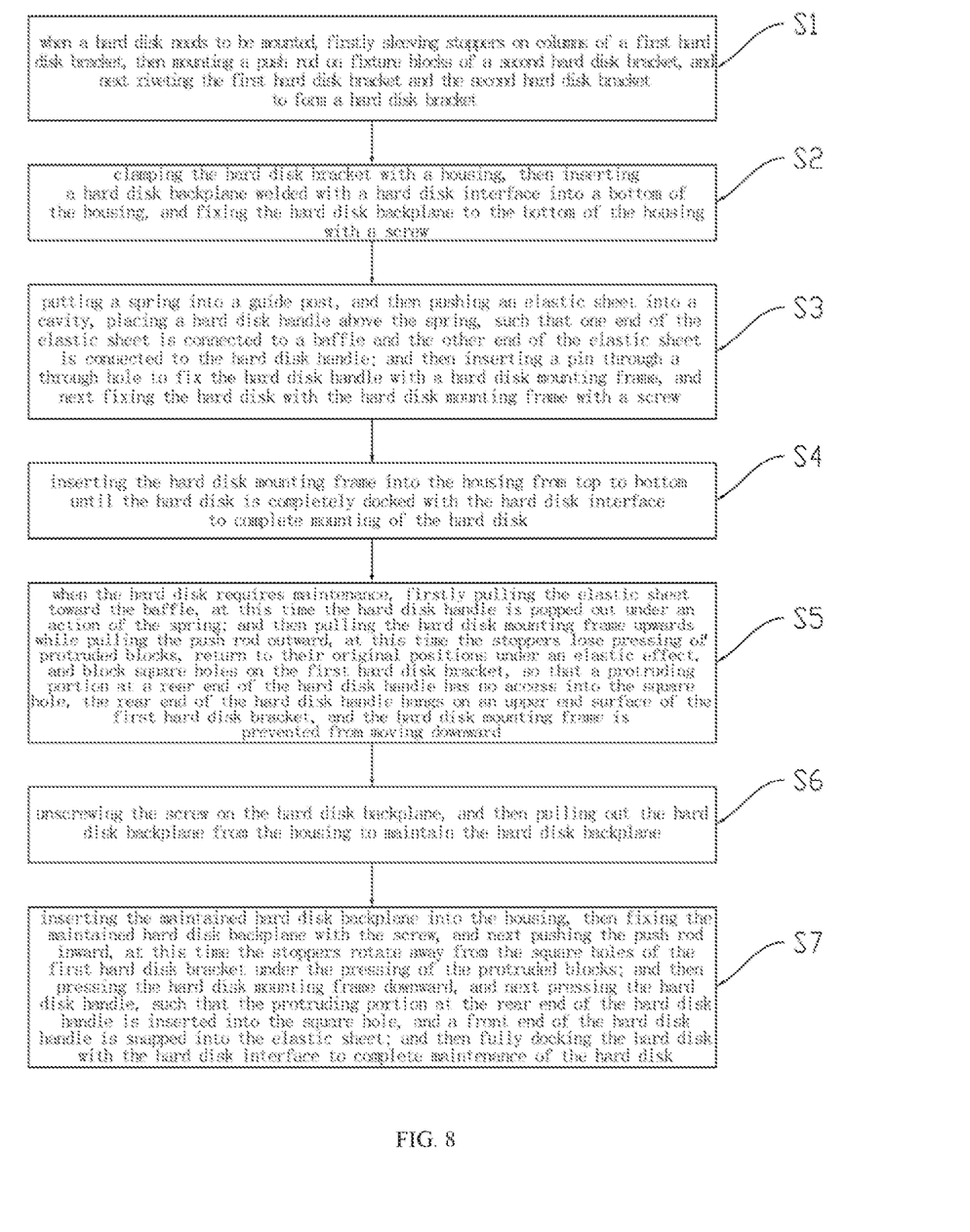
FIG. 8 is a flowchart of a method for hard disk maintenance according to the present application.
Figure 9:
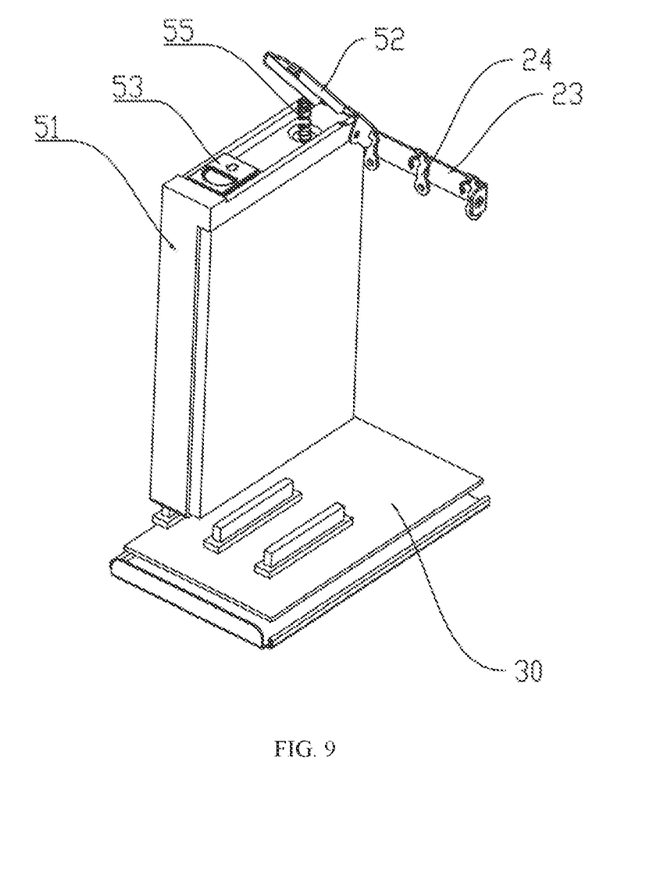
FIG. 9 is a first schematic diagram of the hard disk maintenance according to the present application.
Figure 10:
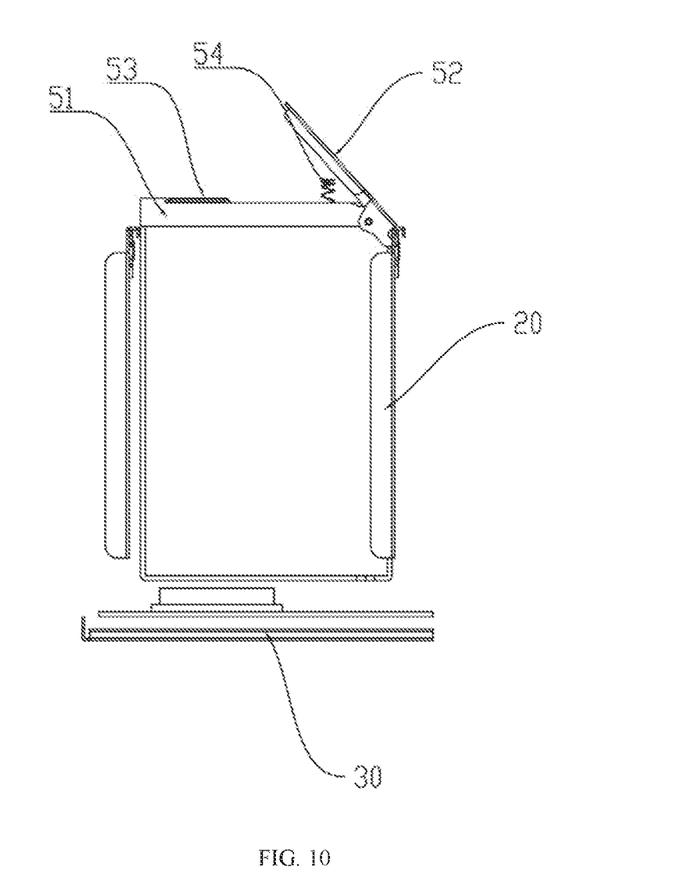
FIG. 10 is a second schematic diagram of the hard disk maintenance according to the present application.
Figure 11:
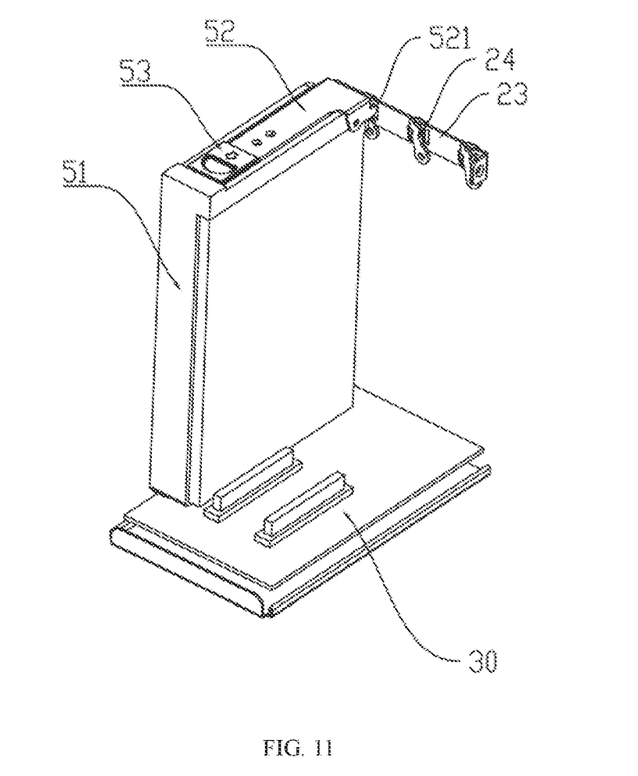
FIG. 11 is a third schematic diagram of the hard disk maintenance according to the present application.
Figure 12:
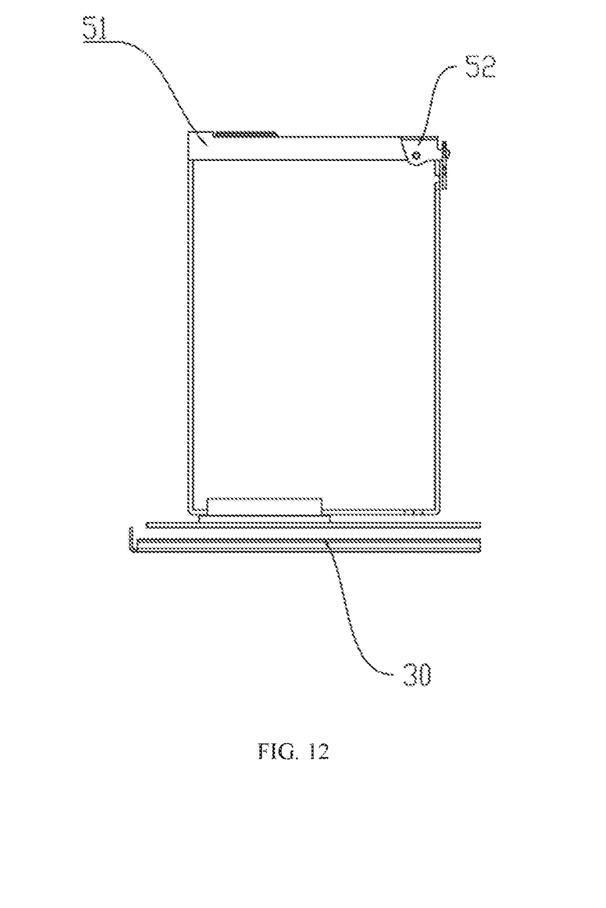
FIG. 12 is a fourth schematic diagram of the hard disk maintenance according to the present application.

S1: when a hard disk needs to be mounted, stoppers are firstly sleeved on columns of a first hard disk bracket, a push rod is then mounted on fixture blocks of a second hard disk bracket, and the first hard disk bracket and the second hard disk bracket are next riveted to form a hard disk bracket;

S2: clamp the hard disk bracket with the housing, then insert a hard disk backplane welded with a hard disk interface into a bottom of the housing, and fix the hard disk backplane to the bottom of the housing with a screw;

S3: put a spring into a guide post, and then push an elastic sheet into a cavity, place a hard disk handle above the spring, such that one end of the elastic sheet is connected to a baffle and the other end is connected to the hard disk handle, and then insert a pin through a through hole to fix the hard disk handle with a hard disk mounting frame, and then fix the hard disk with the hard disk mounting frame by a screw;

S4: insert the hard disk mounting frame into the housing from top to bottom until the hard disk is completely docked with the hard disk interface to complete mounting of the hard disk;

S5: when the hard disk requires maintenance, first pull the elastic sheet toward the baffle, at this time the hard disk handle is popped out under an action of the spring; and then pull the hard disk mounting frame upwards while pull the push rod outward, at this time the stoppers lose pressing of protruded blocks, return to their original positions under an elastic effect, and block square holes on the first hard disk bracket, so that a protruding portion at a rear end of the hard disk handle has no access into the square hole, and the rear end of the hard disk handle hangs on an upper end surface of the first hard disk bracket, thereby preventing the hard disk mounting frame from moving downward;

S6: unscrew the screw on the hard disk backplane, and then pull out the hard disk backplane from the housing to maintain the hard disk backplane;

S7: insert the maintained hard disk backplane into the housing, then fix the maintained hard disk backplane with the screw, and then push the push rod inward, at this time the stoppers rotate away from the square holes of the first hard disk bracket under the pressing of the protruded blocks; and then press the hard disk mounting frame downward, and then press the hard disk handle, such that the protruding portion at the rear end of the hard disk handle is inserted into the square hole, and a front end of the hard disk handle is snapped into the elastic sheet; and then fully dock the hard disk with the hard disk interface to complete maintenance of the hard disk.

The present application reduces connection parts between the bottom and the housing in the existing hard disk bracket, so that the hard disk backplane can be directly inserted and removed from the rear end of the housing, which not only simplifies the maintenance time and maintenance process of the hard disk backplane, but also ensures the structure strength of the server.

The above only uses embodiments to further illustrate the technical content of the present application so as to facilitate easier understanding for the reader, but it does not mean that the implementations of the present application is limited to these embodiments. Any technical extension or re-creation made according to the present application shall be subject to protection of the present application, and the protection scope of the present application is subject to the appended claims.

What is claimed is:

1. A structure for facilitating hard disk maintenance, comprising a housing, a hard disk bracket, a hard disk backplane, a hard disk, and a hard disk mounting assembly, wherein the hard disk bracket is provided at a front end and a rear end of the housing, the hard disk backplane is connected to a bottom of the housing, the hard disk is connected to the hard disk mounting assembly, the hard disk mounting assembly is connected to the hard disk bracket, the hard disk backplane is further provided with a hard disk interface, and the hard disk is also connected to the hard disk interfaces;

wherein the hard disk bracket comprises a first hard disk bracket, a second hard disk bracket, a push rod, and a plurality of stoppers; the first hard disk bracket is provided with columns corresponding to the stoppers, and each of the stoppers is sleeved on corresponding one of the columns; the second hard disk bracket is provided with a plurality of fixture blocks, the push rod is movably connected to the fixture blocks, the push rod is further provided with a protruded block and an opening corresponding to a position of each of the stoppers, a top end of each of the stoppers is provided with a protrusion part corresponding to the protruded block, and the first hard disk bracket is further provided with a square hole corresponding to each of the stoppers; the first hard disk bracket is clamped with the second hard disk bracket.

2. The structure for facilitating hard disk maintenance according to claim 1, wherein the front end and the rear end of the housing are further provided with a notch slot, and the hard disk bracket is inserted into the notch slot.

3. The structure for facilitating hard disk maintenance according to claim 2, wherein a handle is further provided at one side of the push rod, and the handle is located outside the notch slot.

4. The structure for facilitating hard disk maintenance according to claim 3, wherein the housing is U-shaped.

5. The structure for facilitating hard disk maintenance according to claim 4, wherein the first hard disk bracket and the second hard disk bracket are further provided with a sliding groove corresponding to the hard disk mounting assembly.

6. The structure for facilitating hard disk maintenance according to claim 5, wherein a tray is further sleeved on an outside of the hard disk backplane.

7. The structure for facilitating hard disk maintenance according to claim 6, wherein the number of the stoppers is 2-4; the number of the stoppers, the number of the hard disks, and the number of the hard disk interfaces are the same.

8. The structure for facilitating hard disk maintenance according to claim 7, wherein the hard disk mounting assembly comprises a hard disk mounting frame, a hard disk handle, an elastic sheet, a pin, and a spring; the hard disk mounting frame is connected to the hard disk bracket, and the hard disk is connected to the hard disk mounting frame; a top end of the hard disk mounting frame is provided with a cavity, the cavity is provided with a counterbore, the counterbore is provided with a guide post, the spring is sleeved on the guide post, and the hard disk handle is located above the counterbore; a baffle is provided above one end of the cavity, one end of the elastic sheet is connected to the baffle, and the other end of the elastic sheet is connected to the hard disk handle; the hard disk mounting frame is further provided with a through hole, and the pin is inserted through the through hole and is connected to the hard disk handle; a rear end of the hard disk handle is further provided with a protruding portion, and the protruding portion corresponds to a position of the square hole.

9. A method for hard disk maintenance, comprising the following steps of:

when a hard disk needs to be mounted, firstly sleeving stoppers on columns of a first hard disk bracket, then mounting a push rod on fixture blocks of a second hard disk bracket, and next riveting the first hard disk bracket and the second hard disk bracket to form a hard disk bracket;

clamping the hard disk bracket with a housing, then inserting a hard disk backplane welded with a hard disk interface into a bottom of the housing, and fixing the hard disk backplane to the bottom of the housing with a screw;

putting a spring into a guide post, and then pushing an elastic sheet into a cavity, placing a hard disk handle above the spring, such that one end of the elastic sheet is connected to a baffle and the other end of the elastic sheet is connected to the hard disk handle; and then inserting a pin through a through hole to fix the hard disk handle with a hard disk mounting frame, and next fixing the hard disk with the hard disk mounting frame with a screw;

inserting the hard disk mounting frame into the housing from top to bottom until the hard disk is completely docked with the hard disk interface to complete mounting of the hard disk;

when the hard disk requires maintenance, firstly pulling the elastic sheet toward the baffle, at this time the hard disk handle is popped out under an action of the spring; and then pulling the hard disk mounting frame upwards while pulling the push rod outward, at this time the stoppers are not pressed by protruded blocks, return to their original positions under an elastic effect, and block square holes on the first hard disk bracket, so that a protruding portion at a rear end of the hard disk handle has no access into the square hole, the rear end of the hard disk handle hangs on an upper end surface of the first hard disk bracket, and the hard disk mounting frame is prevented from moving downward;

unscrewing the screw on the hard disk backplane, and then pulling out the hard disk backplane from the housing for maintenance of the hard disk backplane;

after the maintenance is given to the hard disk backplane, inserting the hard disk backplane into the housing, then fixing the hard disk backplane with the screw, and next pushing the push rod inward, at this time the stoppers rotate away from the square holes of the first hard disk bracket under the pressing of the protruded blocks; and then pressing the hard disk mounting frame downward, and next pressing the hard disk handle, such that the protruding portion at the rear end of the hard disk handle is inserted into the square hole, and a front end of the hard disk handle is snapped into the elastic sheet; and then fully docking the hard disk with the hard disk interface to complete the maintenance of the hard disk.

* * * * *